United States Patent
Ross

(10) Patent No.: US 11,055,311 B2
(45) Date of Patent: *Jul. 6, 2021

(54) EXPLORATION AND NAVIGATION OF A CONTENT COLLECTION

(71) Applicant: International Business Machines Corporation, Armonk, NY (US)

(72) Inventor: Steven I. Ross, South Hamilton, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/732,903

(22) Filed: Jan. 2, 2020

(65) Prior Publication Data

US 2020/0142902 A1 May 7, 2020

Related U.S. Application Data

(63) Continuation of application No. 15/061,106, filed on Mar. 4, 2016, now Pat. No. 10,565,225.

(51) Int. Cl.
*G06F 16/26* (2019.01)
*G06T 11/20* (2006.01)
(Continued)

(52) U.S. Cl.
CPC ............ *G06F 16/26* (2019.01); *G06F 3/0482* (2013.01); *G06F 3/0485* (2013.01);
(Continued)

(58) Field of Classification Search
CPC ...... G06F 16/26; G06F 16/287; G06F 16/904; G06F 3/0482; G06F 3/0485; G06F 2203/04806; G06T 11/206
See application file for complete search history.

(56) References Cited

U.S. PATENT DOCUMENTS 5,958,008 A 9/1999 Pogrebisky et al.
8,683,389 B1 3/2014 Bar-Yam et al.
(Continued)

OTHER PUBLICATIONS

K. Kim, S. Ko, N. Elmqvistand D. S. Ebert, "WordBridge: Using Composite Tag Clouds in Node-Link Diagrams for Visualizing Content and Relations in Text Corpora," 2011 44th Hawaii International Conference on System Sciences, Kauai, HI, 2011, pp. 1-8, doi: 10.1109/HICSS.2011.499. (Year: 2011).*

(Continued)

*Primary Examiner* — James T Tsai
(74) *Attorney, Agent, or Firm* — Konrad Raynes Davda & Victor LLP; Janaki K. Davda

(57) ABSTRACT

Provided are techniques for exploration and navigation of a content collection. A first window and a second window are created within the user interface displayed on the electronic display. A node graph visualization is displayed in the first window, wherein the node graph visualization comprises nodes representing individual content elements within the content, and wherein the nodes are clustered in proximity to each other according to topics associated with the individual content elements. A text-based topic visualization is displayed in the second window, wherein the text-based topic visualization comprises text elements representing topics associated with the individual content elements within the content. Selection is received of one or more text elements. Highlighting and zooming in is performed on a subset of nodes representing individual content elements associated with a union of the one or more text elements selected corresponding to the one or more topics of interest.

18 Claims, 20 Drawing Sheets

(51) Int. Cl.
  *G06F 3/0482* (2013.01)
  *G06F 16/28* (2019.01)
  *G06F 3/0485* (2013.01)
  *G06F 16/904* (2019.01)

(52) U.S. Cl.
  CPC .......... *G06F 16/287* (2019.01); *G06F 16/904* (2019.01); *G06T 11/206* (2013.01); *G06F 2203/04806* (2013.01)

(56) References Cited

U.S. PATENT DOCUMENTS

| | | | |
|---|---|---|---|
| 9,626,075 | B1 | 4/2017 | Reed |
| 2006/0112108 | A1 | 5/2006 | Eklund et al. |
| 2007/0106780 | A1 | 5/2007 | Farnham et al. |
| 2007/0118439 | A1 | 5/2007 | Kumar et al. |
| 2007/0244859 | A1* | 10/2007 | Trippe ................. G06F 16/338 |
| 2010/0277497 | A1 | 11/2010 | Dong et al. |
| 2011/0202886 | A1 | 8/2011 | Deolalikar et al. |
| 2013/0111320 | A1* | 5/2013 | Campbell ............... G06F 9/451 715/212 |
| 2013/0212479 | A1* | 8/2013 | Willis .................... G06Q 10/10 715/736 |
| 2013/0229416 | A1* | 9/2013 | Krajec .................. G06F 11/302 345/440 |
| 2014/0019119 | A1 | 1/2014 | Liu et al. |
| 2014/0040275 | A1 | 2/2014 | Dang et al. |
| 2014/0164913 | A1 | 6/2014 | Jaros et al. |
| 2014/0195950 | A1 | 7/2014 | Diament et al. |
| 2014/0280045 | A1 | 9/2014 | Smolinski et al. |
| 2014/0317104 | A1 | 10/2014 | Isaacs et al. |
| 2015/0302036 | A1 | 10/2015 | Kumar et al. |
| 2015/0347571 | A1 | 12/2015 | Blaas et al. |
| 2016/0171090 | A1* | 6/2016 | Schwartz ............. G06Q 10/101 707/730 |
| 2016/0203195 | A1 | 7/2016 | Troukhan et al. |
| 2017/0255686 | A1 | 9/2017 | Ross |
| 2018/0300576 | A1 | 10/2018 | Dalyac et al. |

OTHER PUBLICATIONS

"Exemlpar-based Visualization of Large Document Corpus", [online]. Updated Sep. 28, 2011. Retrieved on Mar. 4, 2016 from the Internet at <URL: http://www.vii.wayne.edu/nsf-cri-project_topic8.htm>, Total 2 pp. Also accepted by IEEE Information Visualization Conference (IEEE InfoVis), Atlantic City, NJ, USA, 2009, the journal version appeared in IEEE Transactions on Visualization and Computer Graphics (TVCG), vol. 15, No. 6, pp. 1161-1168, Nov./Dec. 2009.
"Jigsaw: Visual Analytics for Exploring and Understanding Document Collections", [online]. Last modified: Jan. 20, 2014. Retrieved on Mar. 4, 2016 from the Internet at <URL: http://www.cc.gatech.edu/gvu/ii/jigsaw/>, Total 5 pp.
Gorley, Sean, "Vision Statement: Locating Your Next Strategic Opportunity," Harvard Business Review, Mar. 2011.
ip.com, "Method by Which Information is Shared Given a Time, Date, or Location to Enhance Historical Significance of Web Based Content", May 1, 2014, IP.com No. 000236538, retrieved from the Internet at: <URL: http://null/IPCOM/000236538>, Total 28 pp.
ip.com, "Methods, Systems, and Media for Prompting Influential Users to Promote Content", May 15, 2014, IP.com No. 000236794, retrieved from the Internet at: <URL: http://null/IPCOM/000236794>, Total 35 pp.
Grace Period Disclosure—M. Martino, "Presenting Watson News Explorer ", Jul. 20, 2015, 29 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grange, "The NIST Definition of Cloud Computing (Draft)", Sep. 2011, Computer Security Division Information Technology Laboratory National Institute of Standards and Technology, Total 7 pp.
A. Perer and B. Shneiderman, "Integrating Statistics and Visualization for Exploratory Power: From Long-Term Case Studies to Design Guidelines", in IEEE Computer Graphics and Applications, vol. 29, No. 3, pp. 39-51, May-Jun. 2009. (Year: 2009).
List of IBM Patents or Patent Applications Treated as Related, dated Jan. 2, 2020, 2 pp. (Appendix P).
Office Action 1 for U.S. Appl. No. 15/061,106, 22 pp., dated Mar. 19, 2018.
Response to Office Action 1 for U.S. Appl. No. 15/061,106, 22 pp., dated Jun. 7, 2018.
Final Office Action 1 for U.S. Appl. No. 15/061,106, 18 pp., dated Sep. 14, 2018.
Response to Final Office Action 1 for U.S. Appl. No. 15/061,106, 16 pp., dated Dec. 14, 2018.
Office Action 3 for U.S. Appl. No. 15/061,106, 20 pp., dated Feb. 21, 2019.
Response to Office Action 3 for U.S. Appl. No. 15/061,106, 16 pp., dated May 10, 2019.
Notice of Allowance 1 for U.S. Appl. No. 15/061,106, 26 pp., dated Oct. 3, 2019.

\* cited by examiner

FIG. 4E

How we read each other's minds

EXPLORATION AND NAVIGATION OF A CONTENT COLLECTION

FIELD

Embodiments of the invention relate to exploration and navigation of a content collection.

BACKGROUND

Users of information systems are frequently faced with the problem of information overload. They come upon a collection of content, be it a document repository, video collection, news feed, or search results, and are overwhelmed by the sheer number of items to consider, and by their lack of a priori knowledge of what the domain of content contains. Tools to search or filter the content are only helpful to the extent that the user has some idea of what sorts of things to search for or what aspects to filter in or out.

In more structured domains, tools exist that permit a faceted search, where users can, for example, filter a set of products by a variety of dimensions, such as manufacturer, price, power, customer ratings, etc. These tools become less valuable with collections of unstructured content.

The problem of exploration and navigation of a document collection (or corpus) is a longstanding one. Some conventional systems provide a network graph of topics. Other conventional systems provide a dimensional reduction on documents based on their contents and plot them in a two-dimensional space. Yet other conventional systems provide a word cloud to represent the contents of a document or set of documents.

SUMMARY

Provided is a method for exploration and navigation of a content collection. The method comprises: creating a first window and a second window within the user interface displayed on the electronic display; displaying a node graph visualization in the first window, wherein the node graph visualization comprises nodes representing individual content elements within the content, and wherein the nodes are clustered in proximity to each other according to topics associated with the individual content elements; displaying a text-based topic visualization in the second window, wherein the text-based topic visualization comprises text elements representing topics associated with the individual content elements within the content; receiving a selection of one or more text elements within the second window corresponding to one or more topics of interest; and highlighting and zooming in on a subset of nodes within the first window representing individual content elements associated with a union of the one or more text elements selected corresponding to the one or more topics of interest.

Provided is a computer program product for exploration and navigation of a content collection. The computer program product comprises a computer readable storage medium having program code embodied therewith, the program code executable by at least one processor to perform: creating a first window and a second window within the user interface displayed on the electronic display; displaying a node graph visualization in the first window, wherein the node graph visualization comprises nodes representing individual content elements within the content, and wherein the nodes are clustered in proximity to each other according to topics associated with the individual content elements; displaying a text-based topic visualization in the second window, wherein the text-based topic visualization comprises text elements representing topics associated with the individual content elements within the content; receiving a selection of one or more text elements within the second window corresponding to one or more topics of interest; and highlighting and zooming in on a subset of nodes within the first window representing individual content elements associated with a union of the one or more text elements selected corresponding to the one or more topics of interest.

Provided is a computer system for exploration and navigation of a content collection. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, wherein the operations comprise: creating a first window and a second window within the user interface displayed on the electronic display; displaying a node graph visualization in the first window, wherein the node graph visualization comprises nodes representing individual content elements within the content, and wherein the nodes are clustered in proximity to each other according to topics associated with the individual content elements; displaying a text-based topic visualization in the second window, wherein the text-based topic visualization comprises text elements representing topics associated with the individual content elements within the content; receiving a selection of one or more text elements within the second window corresponding to one or more topics of interest; and highlighting and zooming in on a subset of nodes within the first window representing individual content elements associated with a union of the one or more text elements selected corresponding to the one or more topics of interest.

BRIEF DESCRIPTION OF THE SEVERAL VIEWS OF THE DRAWINGS

Referring now to the drawings in which like reference numbers represent corresponding parts throughout:

FIGS. 4A, 4B, 4C, 4D, 4E, 4F, and 4G illustrate an example of exploration and navigation in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

With embodiments, there is a collection of content elements. For example, the content elements may be videos, documents, blogs, web sites, news articles, search results, etc. or any combination of these (e.g., the content elements may be a combination of videos and related documents). Embodiments rely on a characterization of the content elements of the collection, such that each content element is associated with a small number of topics. Embodiments display text elements representing the topics for the entire collection in a text-based topic visualization (e.g., a topic cloud or a topic grid) and display a visualization of the content elements themselves in a dimensional reduction display ("node graph visualization").

A dimensionality reduction takes high dimension data and represents it in a smaller number of dimensions, so that it may be more easily analyzed or visualized. For example, the content elements of the collection may be considered to be existing in a high dimensional space, where there are dimensions for each topic, and a particular content element exists at the point in space where all its associated topics intersect. Embodiments plot these content elements in two dimensions, but try to maintain their distances from the high dimensionality space, so that content elements that were far apart in the high dimensional space are far apart in the two-dimensional space, and content elements that were close in the high dimensional space are close in the two-dimensional space.

Embodiments combine these two different visualizations in a way that lets selection of text elements that represent topics in the text-based topic visualization serve to navigate through the space of content elements in the node graph visualization and highlights the selected text elements that represent the topics in the text-based topic visualization, thus guiding further navigation and discrimination among the content elements.

Figure 1:
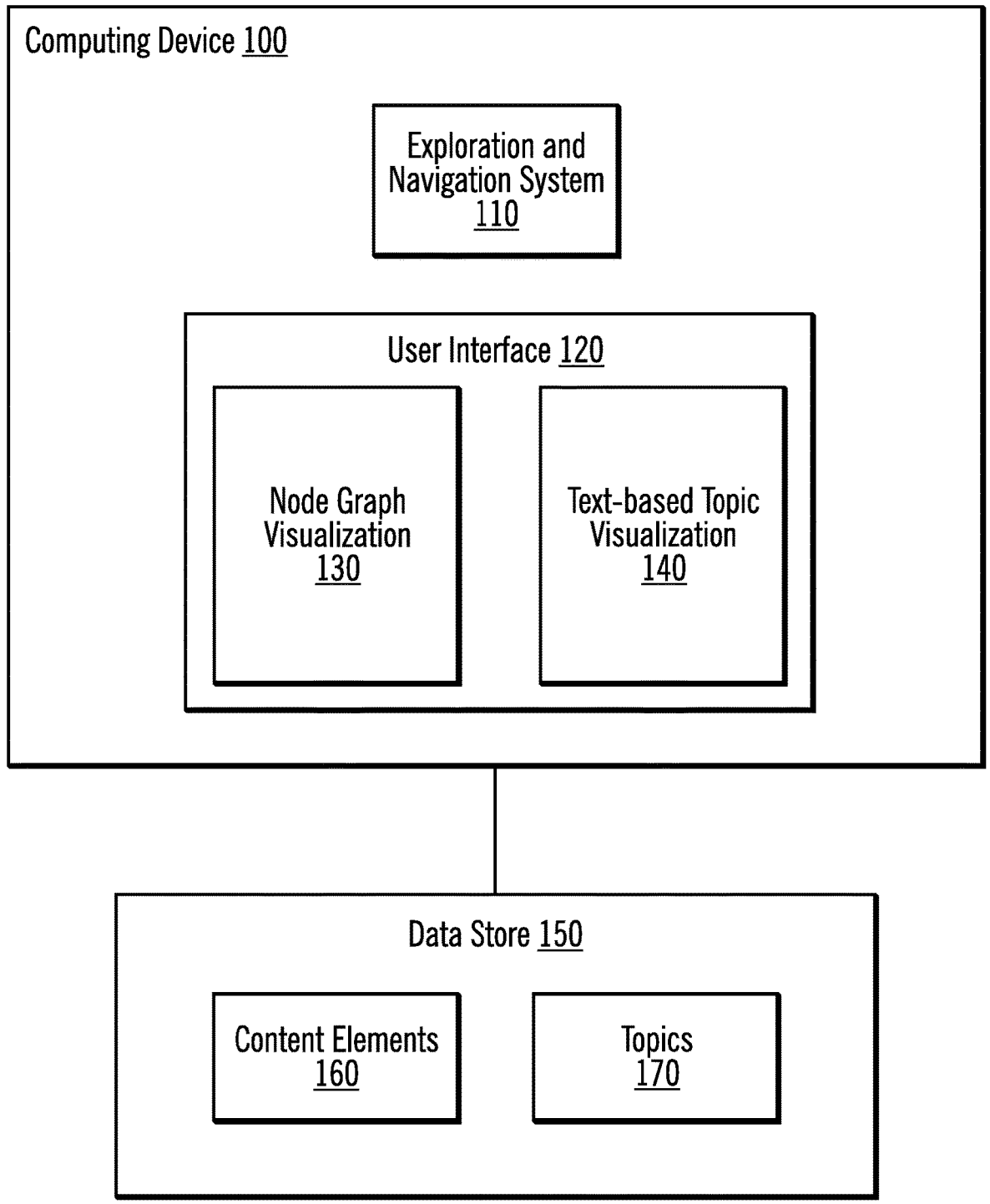
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to a data store 150. The computing device 100 includes an exploration and navigation system 110 and a user interface 120 (provided by the exploration and navigation system 110). The user interface displays a node graph visualization 130 and a text-based topic visualization 140. The data store 150 includes content elements 160 and topics 170.

Figure 2:
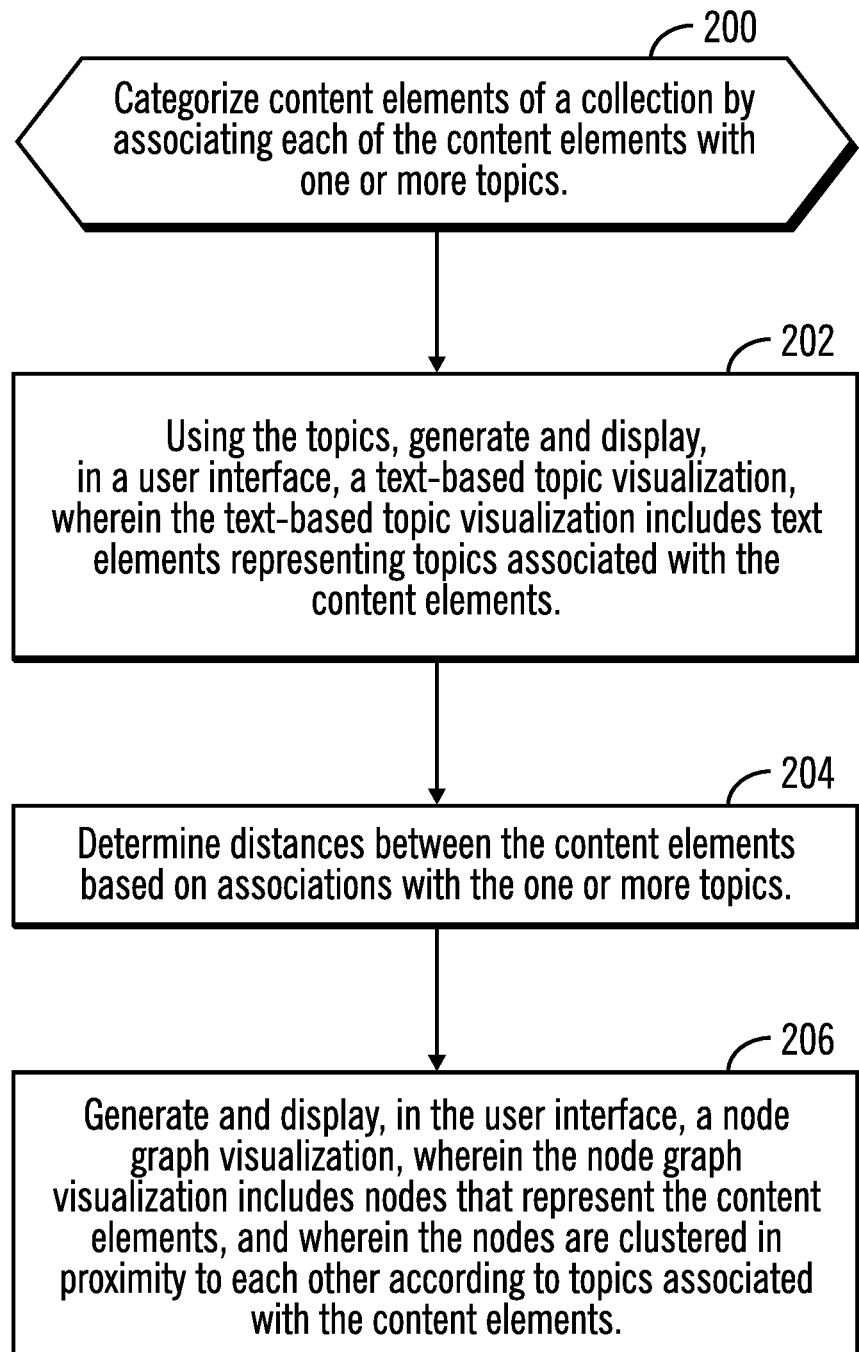
FIG. 2 illustrates, in a flow chart, operations for exploration and navigation of a content collection in accordance with certain embodiments.

FIG. 2 illustrates, in a flow chart, operations for exploration and navigation of a content collection in accordance with certain embodiments. The combined display includes both a node graph visualization and a text-based topic visualization.

Control begins at block 200 with the exploration and navigation system 110 categorizing content elements of a collection by associating each of the content elements with one or more topics. These topics may come from curators, from a collaborative tagging facility, from an automated process that performs text analytics (e.g., entity extraction and/or concept detection), etc.

In block 202, using the topics, the exploration and navigation system 110 generates and displays, in a user interface, a text-based topic visualization, wherein the text-based topic visualization includes text elements representing the topics associated with the content elements. In particular, the exploration and navigation system 110 displays the overall set of topics using text elements in the text-based topic visualization in the user interface. In various embodiments, the individual text elements in the text-based topic visualization are sized depending upon the number of content elements in the collection associated with them or by some other measure of their importance.

In block 204, the exploration and navigation system 110 determines distances (similarities) between the content elements based on associations with the one or more topics. This may also be described as the computation of distances. Such computation may be done explicitly or implicitly (e.g., force directed graph networks of the content elements and topics may be generated which naturally pull together content elements that have many topics in common). In particular, the association of one or more topics with each content element of the collection enables the exploration and navigation system 110 to compute a similarity between individual content elements. There are a variety of ways of doing this, such as computing a Euclidean distance in n-dimensional space, where n is the total number of topics, performing a cosine similarity calculation or other means of computing distances between the content elements.

With embodiments, if the distances are a measure between 0 and 1 of how much two content elements have in common, with 0 indicating that they are identical and 1 indicating that they are completely different, then similarity may be 1-distance, where 0 represents completely different and 1 represents completely identical in terms of topic characterization. Distances/similarities are the basis for computing the forces that are used to determine the placement of the individual content elements.

In block 206, the exploration and navigation system 110 generates and displays, in the user interface, a node graph visualization, wherein the node graph visualization includes nodes that represent the content elements, and wherein the nodes are clustered in proximity to each other according to topics associated with the content elements. That is, the placement of the nodes of the node graph visualization is based on the determined distances. The node graph visualization may be described as a representation of the content elements laid out in a two-or-three dimensional space using a force-directed graph approach. A force-directed graph approach may be described as a technique of laying out a network visualization by doing a physical simulation of the network as a series of objects that exert attractive or repulsive forces upon each other. Whether done using the pre-calculated ideal distances between objects or through connecting the content elements to nodes representing the dimensions, it is effectively a means for doing multidimensional scaling. The net effect is to place the content elements on a display screen such that similar content elements tend to be near each other and differing content elements tend to be far apart. Clusters of content elements that have much in common will naturally form, and users may navigate around the space and find individual content elements of interest.

With embodiments, the exploration and navigation system 110 determines distances between the content elements based on shared topics. Then, the exploration and navigation system 110 uses the distances to position the nodes representing the content elements relative to each other, wherein the nodes representing the content elements with more topics in common are positioned closer to each other.

The exploration and navigation system 110 enables interplay between the node graph visualization and the text-based topic visualization. On the one hand, the node graph visualization is a visualization of the content elements themselves, organized such that similar content elements are close together in the display. On the other hand, the text-based topic visualization shows the ways in which these content elements have been characterized.

Figure 3A:
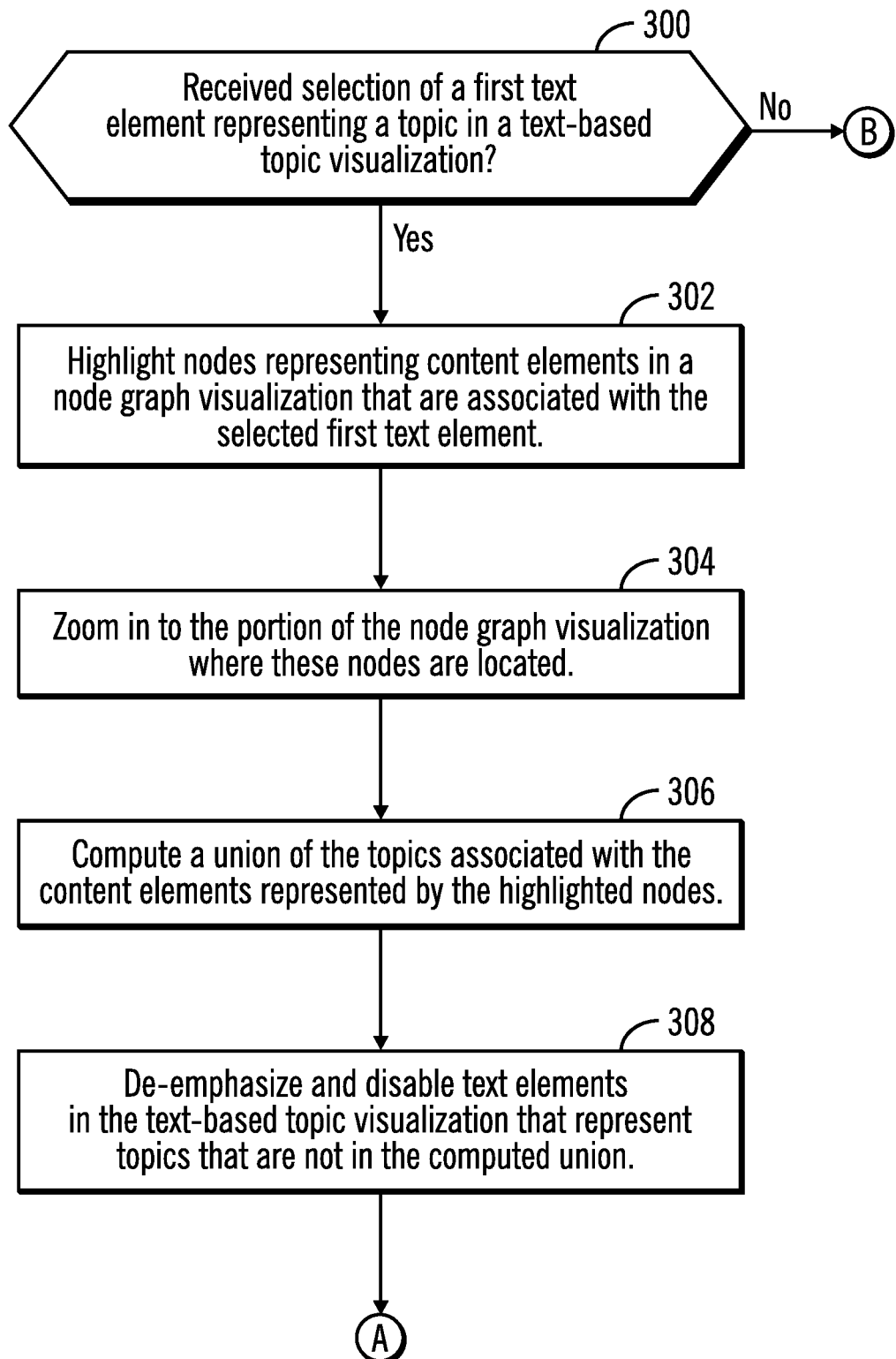
FIGS. 3A, 3B, 3C, 3D, and 3E illustrate, in a flow diagram, operations for navigating among a node graph visualization and a text-based topic visualization in accordance with certain embodiments.
Figure 3B:
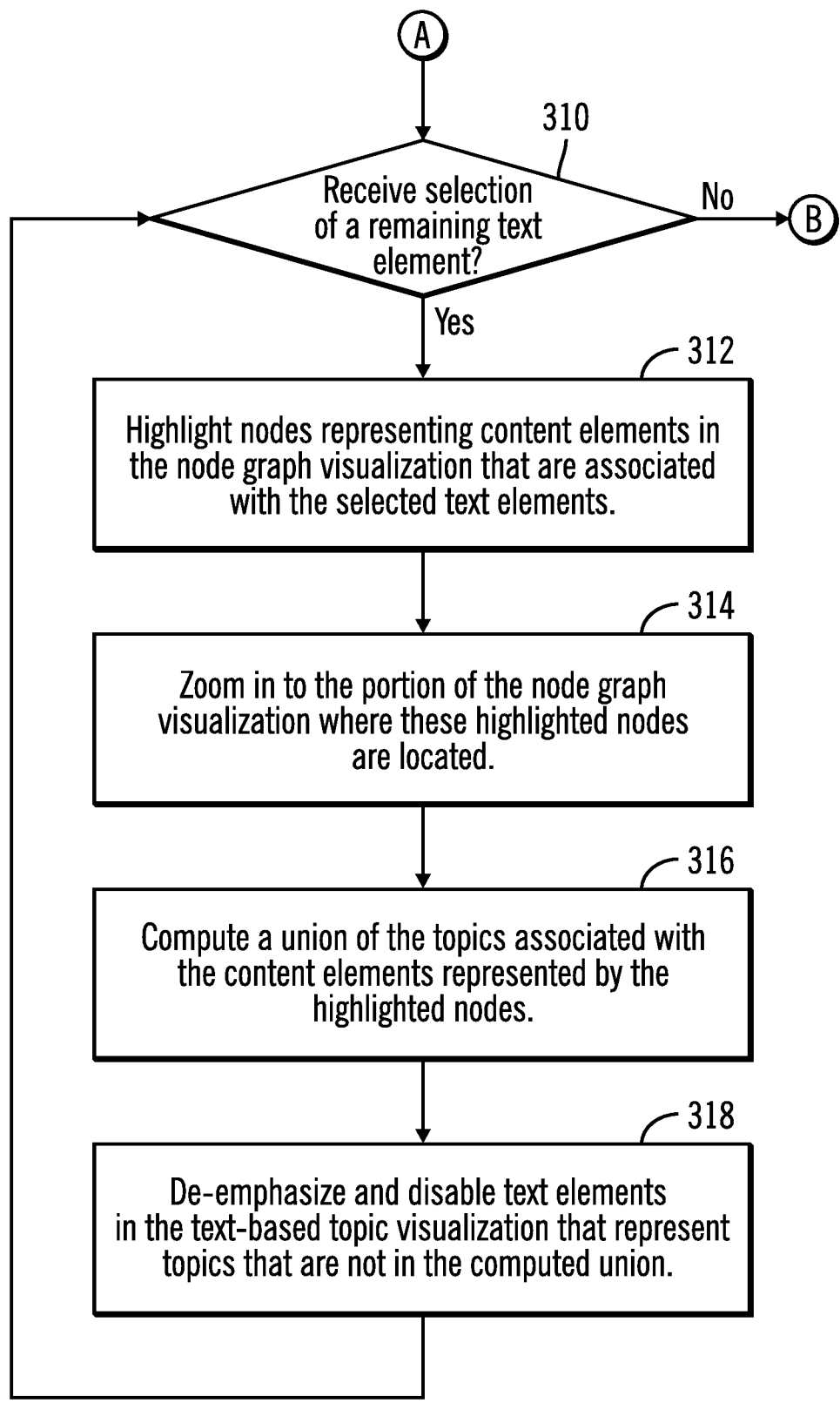

FIGS. 3A, 3B, 3C, 3D, and 3E illustrate, in a flow diagram, operations for navigating among the node graph visualization and the text-based topic visualization in accordance with certain embodiments. Control begins at block 300 with the exploration and navigation system 110 determining whether selection of a first text element representing a topic in a text-based topic visualization has been received. If so, processing continues to block 302, otherwise, processing continues to block 310 (FIG. 3B). In block 302, the exploration and navigation system 110 highlights nodes representing content elements in a node graph visualization that are associated with the selected first text element. In block 304, the exploration and navigation system 110 zooms in to the portion of the node graph visualization where these nodes are located. In block 306, the exploration and navigation system 110 computes a union of the topics associated with the content elements represented by the highlighted nodes. In block 308, the exploration and navigation system 110 de-emphasizes and disables text elements in the text-based topic visualization that represent topics that are not in the computed union. From block 308 (FIG. 3A), processing continues to block 310 (FIG. 3B).

Figure 3C:
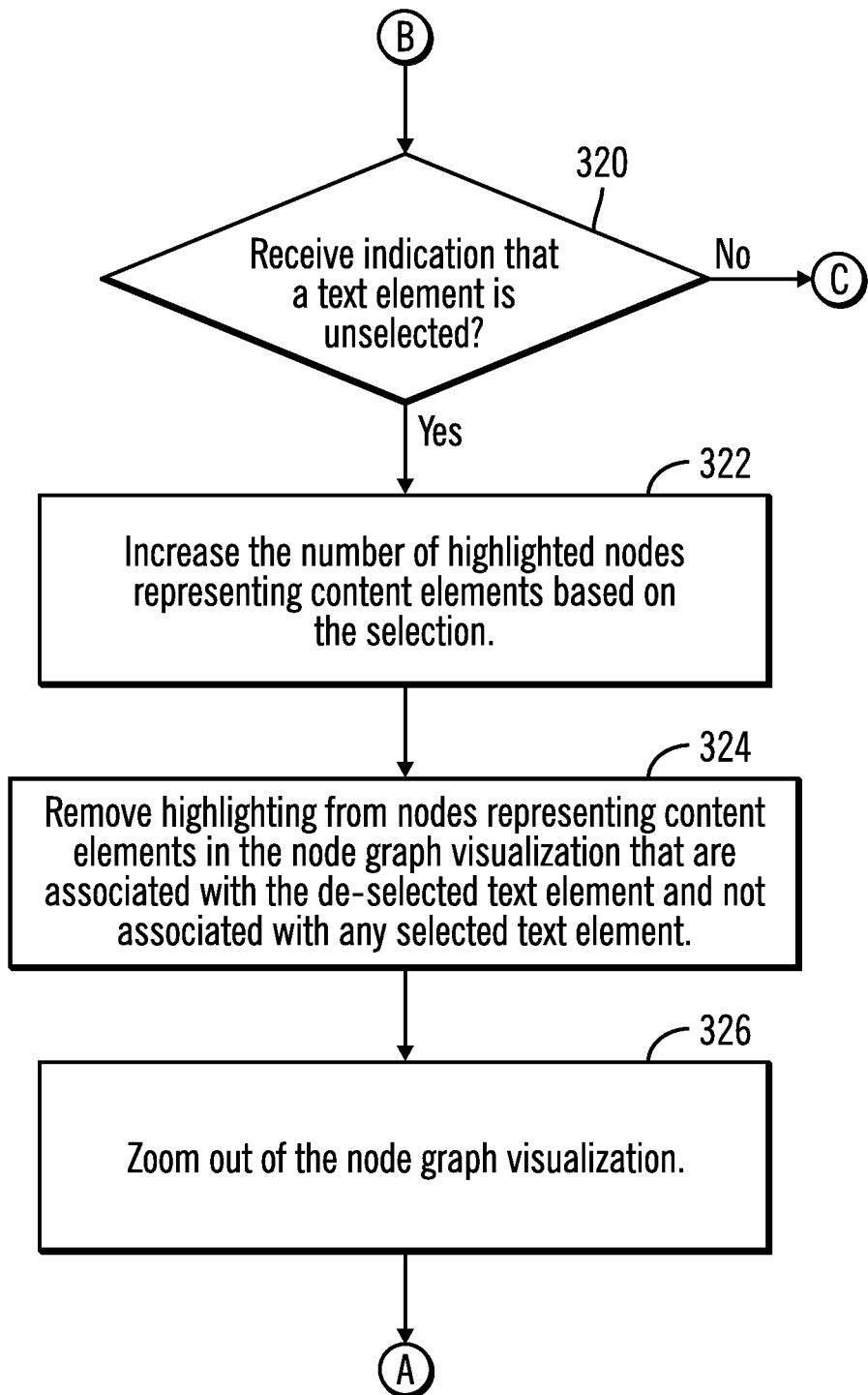

In block 310, the exploration and navigation system 110 determines whether selection of a remaining text element has been received. If so, processing continues to block 312, otherwise, processing continues to block 320 (FIG. 3C). In block 312, the exploration and navigation system 110 highlights nodes representing content elements in the node graph visualization that are associated with the selected text elements. For example, highlighting only content elements associated with both topics may reduce the number of highlighted content elements. In block 314, the exploration and navigation system 110 zooms in to the portion of the node graph visualization where these highlighted nodes are located. In block 316, the exploration and navigation system 110 computes a union of the topics associated with the content elements represented by the highlighted nodes. In block 318, the exploration and navigation system 110 de-emphasizes and disables text elements in the text-based topic visualization that represent topics that are not in the computed union. From block 318 (FIG. 3B), processing continues to block 310 (FIG. 3B).

Figure 3D:
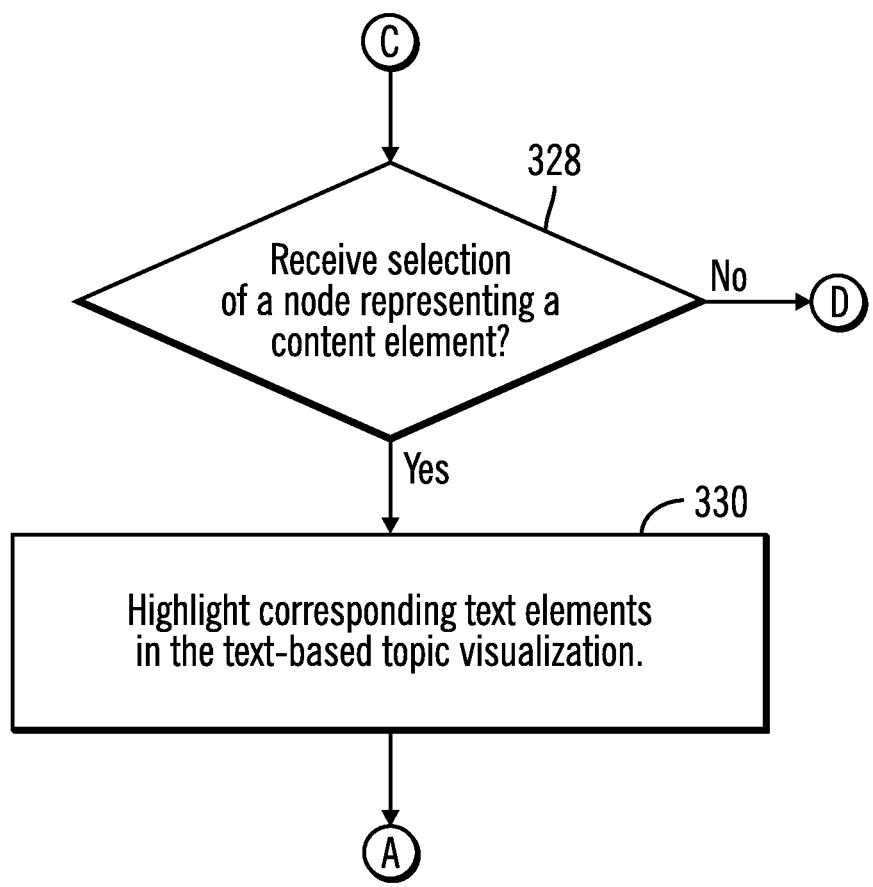

In block 320, the exploration and navigation system 110 determines whether an indication that a text element is unselected has been received. If so, processing continues to block 322, otherwise, processing continues to block 328 (FIG. 3D).

In block 322, the exploration and navigation system 110 increases the number of highlighted nodes representing content elements based on the selection.

With embodiments, if multiple text elements representing topics are selected, then the highlighted content elements correspond to those content elements associated with all selected text elements. Unselecting a text element will then increase the number of content elements highlighted because there will be fewer constraints on the highlighted content elements. The exploration and navigation system 110 computes the set of content elements associated with the intersection of all the topics (represented by the text elements), so reducing the number of selected text elements increases the size of the set of highlighted content elements. With embodiments, this is consistent with the notion of "zooming out", since a "zoom out" results in the display showing a larger number of highlighted content elements. With embodiments, one exception to this is if there is only one text element selected, and then unselecting that results in no content elements being selected, and the exploration and navigation system 110 zooms out to display all content elements.

Conversely, the initial selection may increase the number of highlighted content elements, and the exploration and navigation system 110 zooms in to view just those content elements. When additional text elements are selected, the number of highlighted content elements is less than or equal to what it was before, so the exploration and navigation system 110 will (if it is less than) zoom in to include the remaining highlighted content elements.

When a text element is unselected, some of the text elements in the text-based topic visualization which were previous de-emphasized and disabled because they were inconsistent with the formerly selected text elements may be re-emphasized and re-enabled.

In block 324, the exploration and navigation system 110 removes highlighting from nodes representing content elements in the node graph visualization that are associated with the de-selected text element and not associated with any selected text element. In block 326, the exploration and navigation system 110 zooms out of the node graph visualization. From block 326 (FIG. 3C), processing continues to block 310 (FIG. 3B).

With embodiments, at all times, the user has the ability to navigate manually through the node graph visualization, zooming in and out, or scrolling around to view the different content elements. A user may be investigating the content of a particular cluster of content elements, or once one or more topics have been selected, looking at the various regions that contain highlighted content elements and/or the content elements that are nearby. Users can get information about different content elements by hovering over them or selecting them, or in some cases by simply reading the information presented by default for each content element.

Figure 3E:
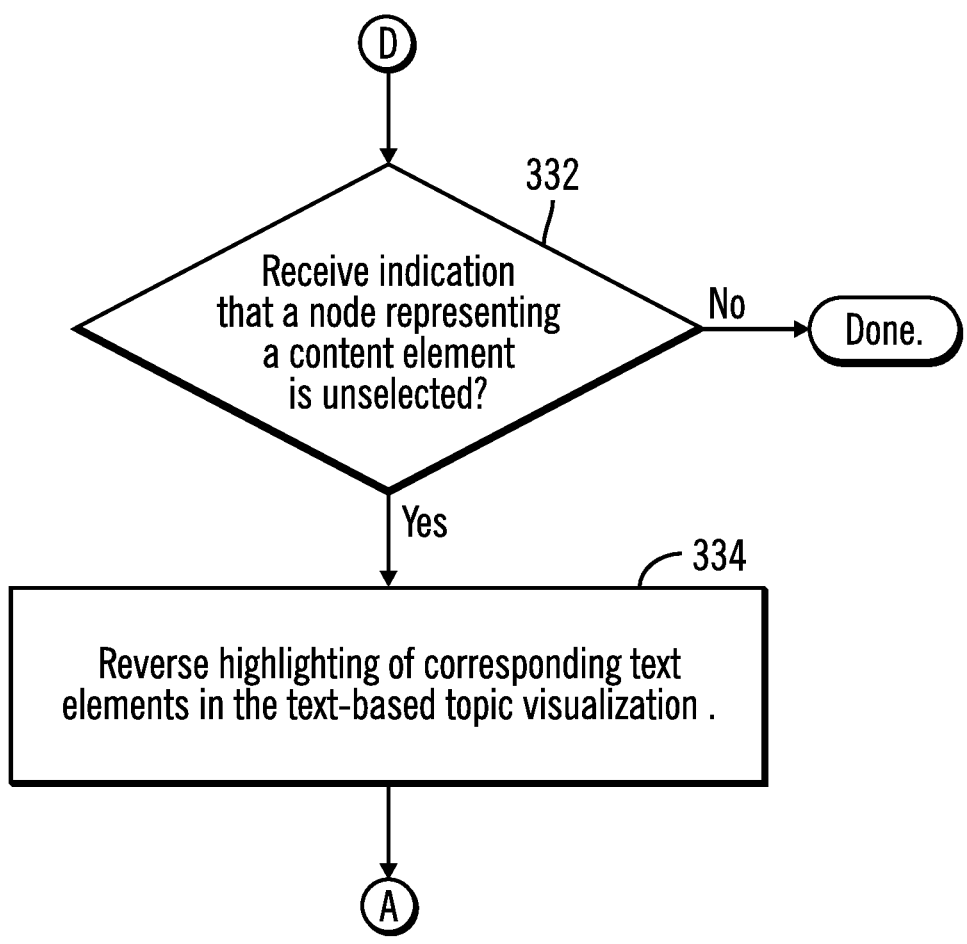

In block 328, the exploration and navigation system 110 determines whether selection of a node representing a content element has been received. If so, processing continues to block 330, otherwise, processing continues to block 332 (FIG. 3E). In block 330, the exploration and navigation system 110 highlights corresponding text elements in the text-based topic visualization. From block 330 (FIG. 3D), processing continues to block 310 (FIG. 3B).

In block 332, the exploration and navigation system 110 determines whether an indication that a node representing a content element is unselected has been received. If so, processing continues to block 334, otherwise, processing is done until the user makes a further selection. In block 334, the exploration and navigation system 110 reverses highlighting of corresponding text elements in the text-based topic visualization. From block 334 (FIG. 3E), processing continues to block 310 (FIG. 3B).

Thus, with embodiments, when a user selects a text element representing a topic in the text-based topic visualization, the nodes representing the content elements in the node graph visualization that are associated with the topic are highlighted, and the exploration and navigation system 110 zooms in to the portion of the node graph visualization where these nodes are located. The union of all the topics associated with the highlighted content elements is computed, and all the text elements representing topics in the text-based topic visualization that are not in the computed set are de-emphasized and disabled. The remaining text elements representing topics in the text-based topic visualization are those that may be used to further discriminate among the highlighted content elements. Selecting one of the remaining text elements representing topics further reduces the number of highlighted nodes representing content elements. Then, nodes for content elements that are associated with both text elements are highlighted, and the exploration and navigation system 110 zooms in further, and more text elements in the text-based topic visualization are disabled.

With embodiments, unselecting a selected text element reverses the process, increasing the number of nodes highlighted, causing the exploration and navigation system 110 to zoom out, and re-enabling some disabled text elements in the text-based topic visualization. This process may continue until a sufficiently small number of nodes are highlighted that enables the user to easily peruse them.

Thus, a user may rapidly home in on the desired content by successively refining the set of topics that are of interest. With embodiments, it isn't necessary for the user to know ahead of time what the domain of content is about or what topics will be available.

When a user selects (e.g., hovers over or otherwise selects) a particular node representing a content element in the display, the text elements representing topics corresponding to the selected node may be highlighted (e.g., may light up) in the text-based topic visualization. This enables an exploration of the node graph visualization that enables a user to discover the characteristics of particular clusters, for example.

With embodiments, unlike most filtering schemes, the nodes representing content elements being filtered out are not removed from view. So, it is possible to discover a content element of interest that is not characterized by the currently selected text elements representing topics by serendipity. The nodes representing content elements near the highlighted ones may still be of interest even though they don't quite match the criteria, since they will usually involve overlapping topics, and will be easy to find or stumble over. Of course, filtering out non-matching nodes is still an option.

Merely to enhance understanding, an example will be provided herein. FIGS. 4A, 4B, 4C, 4D, 4E, 4F, and 4G illustrate an example of exploration and navigation in accordance with certain embodiments. In the example of FIGS. 4A, 4B, 4C, 4D, 4E, 4F, and 4G, the content elements are talks in videos.

Figure 4A:
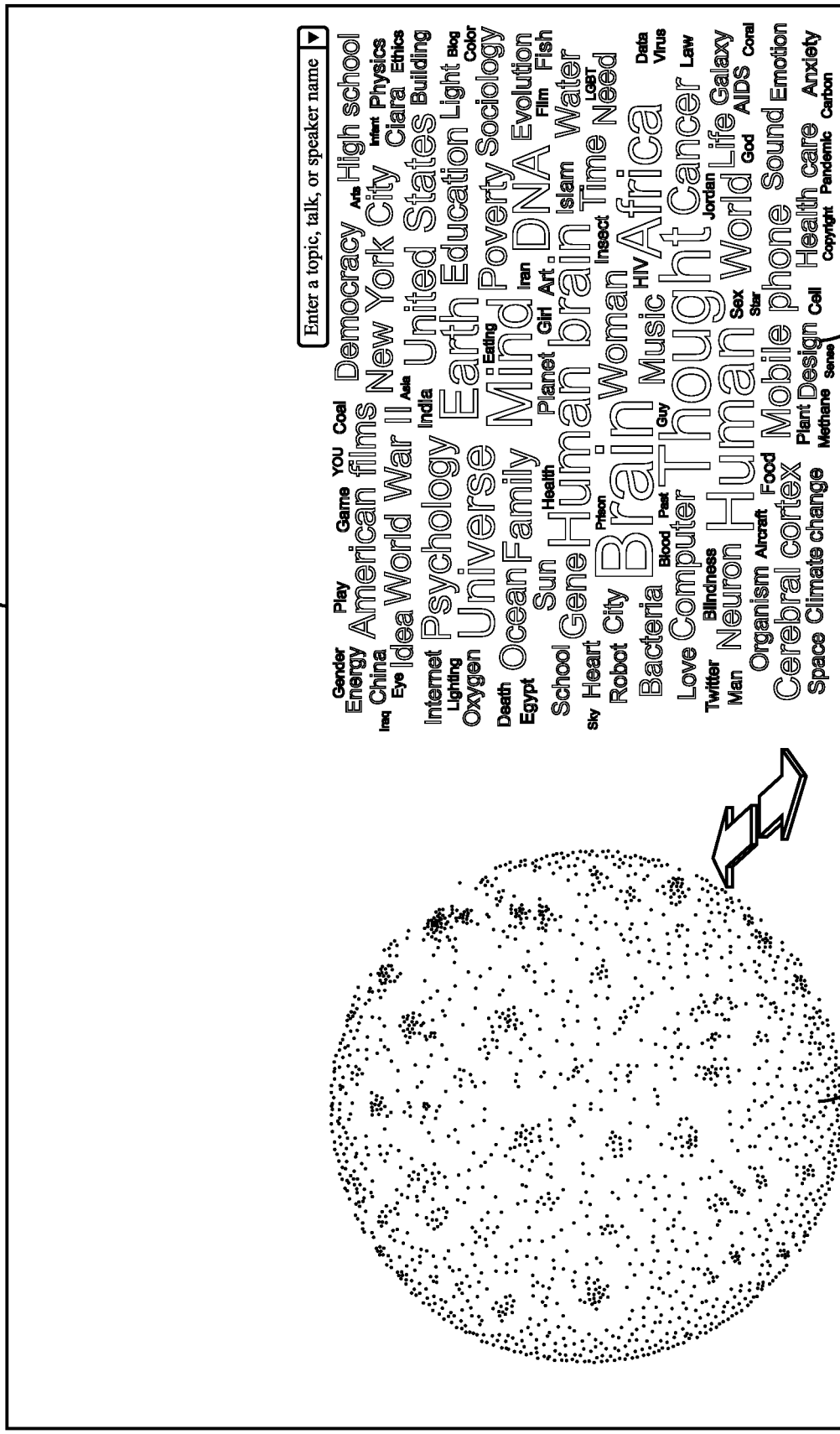

FIG. 4A illustrates a combined display in accordance with certain embodiments. In FIG. 4A, the combined display 400 includes a node graph visualization 402 and a text-based topic visualization 404. In this example, the text-based topic visualization 404 is a topic cloud. With embodiments, the text-based topic visualization 404 is derived automatically via topic extraction over the transcripts of the talks. In FIG. 4A, the size of a text element representing an individual topic is based on the number of talks associated with that topic.

Figure 4B:
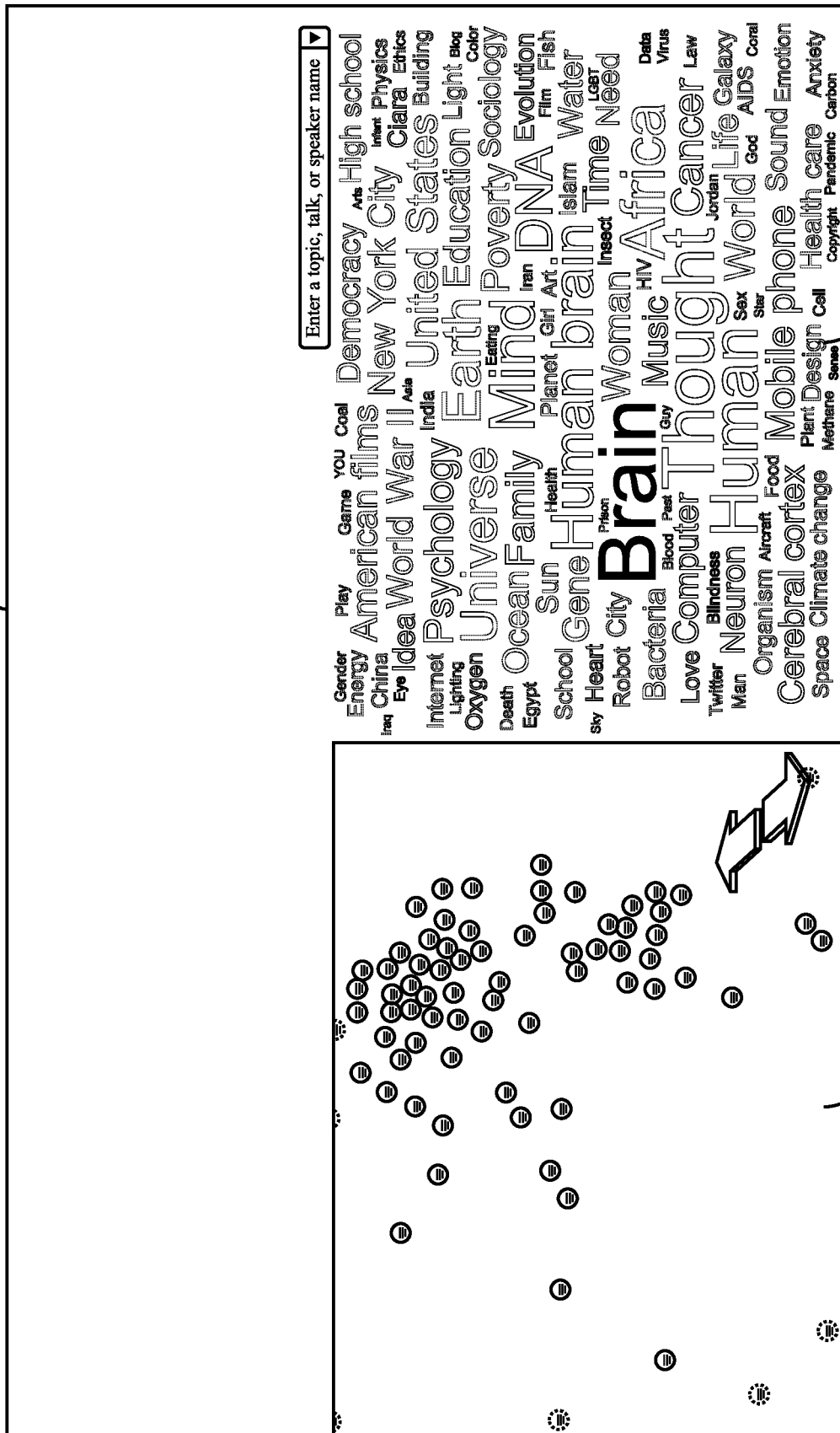

For this example, one of the larger text elements, "Brain", is selected in FIG. 4A, and the exploration and navigation system 110 focuses on displaying the nodes representing talks that are associated with the "Brain" text element in FIG. 4B. In FIG. 4B, the exploration and navigation system 110 has zoomed in on the cluster of brain-related nodes in the node graph visualization 402. In FIG. 4B, the selected "Brain" text element is highlighted. Also, in FIG. 4B, the solid-lined circles correspond to the solid-lined text (e.g., "Brain") and represent the zoomed-in cluster of brain-related text elements. In certain embodiments, the selected "Brain" text element and the cluster of brain-related nodes may also be shown in a different color (e.g., red) than other text elements and nodes. Also, the exploration and navigation system 110 has disabled many of the text elements in the text-based topic visualization 404 (and these are shown as hollow text with dotted lines, such as "Universe"), and the text elements in the text-based topic visualization 404 that are not disabled (and these are shown as hollow text with solid lines, such as "Psychology") may be used to further refine the set of highlighted talks. With the example in FIG. 4B, none of the highlighted nodes are associated with text elements, such as "Universe" or "Ocean", but at least some of those nodes are associated with text elements such as "DNA" and "Love". In FIG. 4B., the dotted circles correspond to the dotted text (e.g., "Psychology", "DNA", and "Love") and represent content elements not associated with the selected text element "Brain". In other embodiments, the selected text element, the disabled text elements, and the text elements that are not disabled may be shown in different colors or otherwise displayed to distinguish them from each other.

Figure 4C:
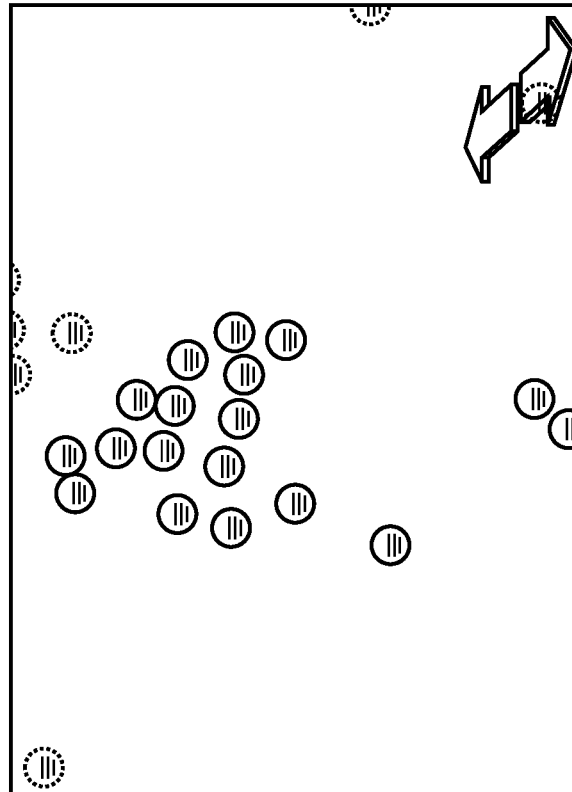

For this example, the "Mind" text element is selected to further refine the set of nodes to be associated with both the "Brain" text element and the "Mind" text element. In FIG. 4C, the selected "Mind" text element is shown in larger text (relative to text other than the previously selected "Brain" text element) and in bold. In FIG. 4C, the set of highlighted nodes (shown with solid-lined circles) in the node graph visualization 402 is smaller, as is the set of discriminating text elements (shown with dotted text) remaining in the text-based topic visualization 404 (i.e., topics that have not been disabled). For example, the "DNA" text element and the "Love" text element have been disabled in FIG. 4C (and they were not disabled in FIG. 4B), but the "Psychology" text element and the "Neuron" text element are not disabled in FIG. 4C (and they were not disabled in FIG. 4B).

Figure 4D:
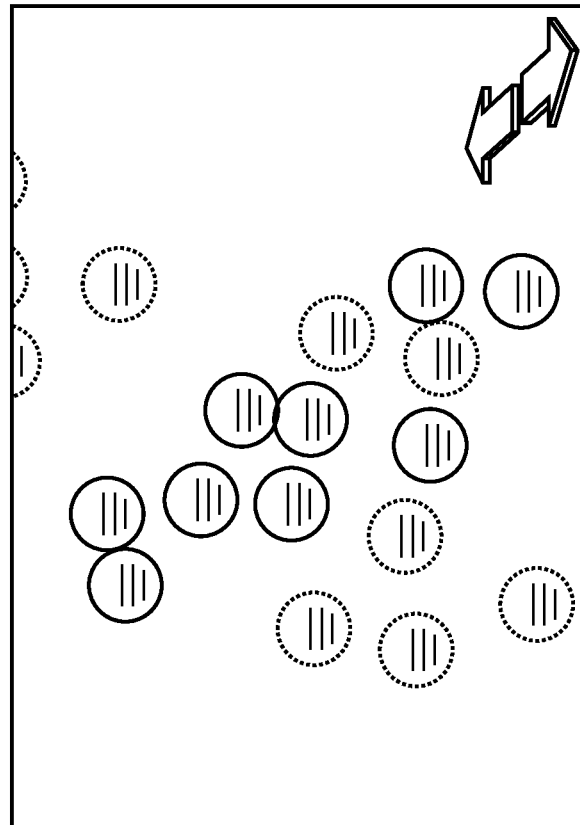

Continuing with the example, the "Cerebral Cortex" text element is select in addition to the "Brain" and "Mind" text elements. The combined display 400 of FIG. 4D is in response to these three selections by a user, and this has reduced a set of 1800 nodes to 9 highlighted nodes (shown with solid-lined circles).

Figure 4E:
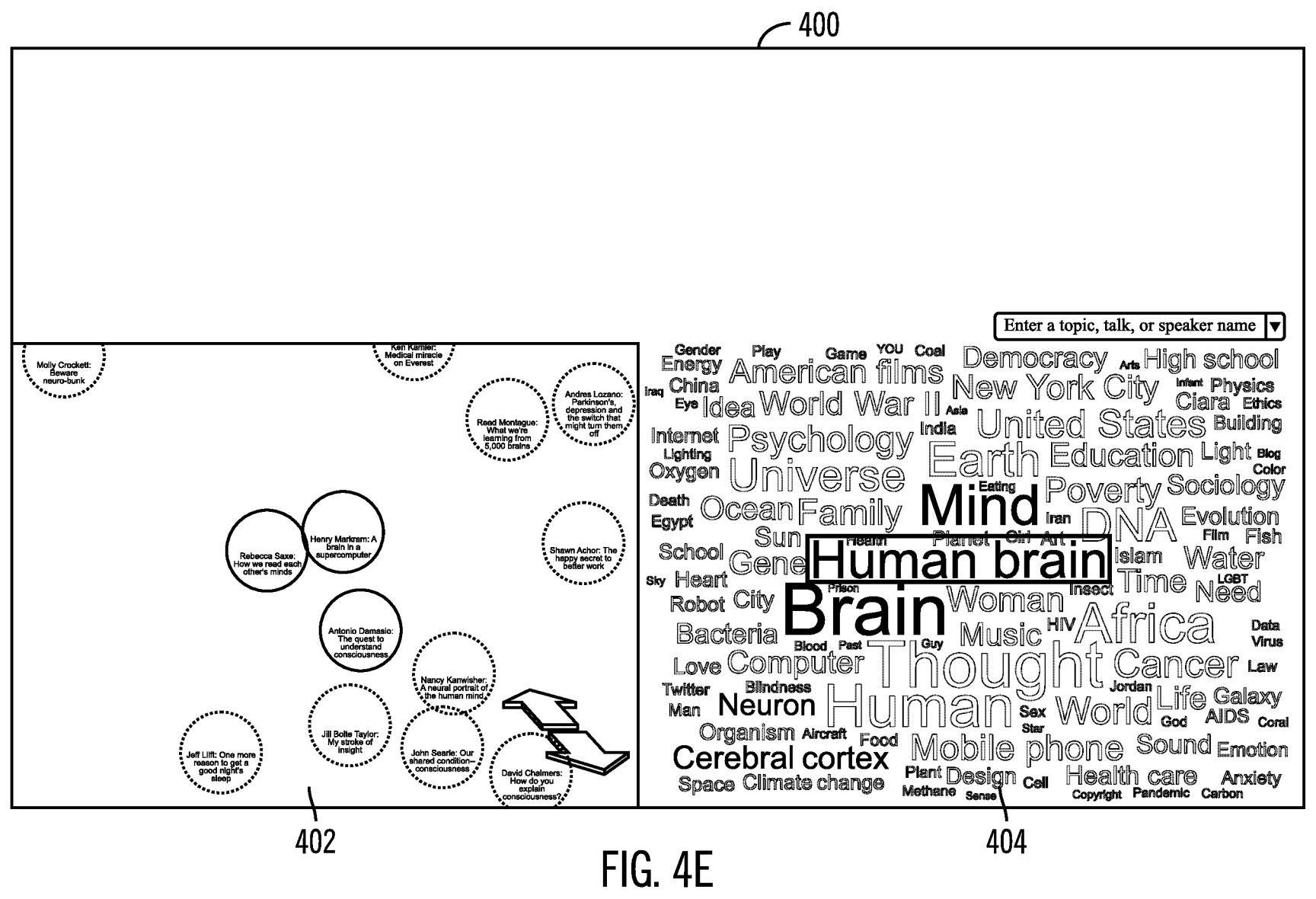

Next, with this example, the "Neuron" text element is selected, in addition to the "Brain", "Mind", and "Cerebral Cortex" text elements. The combined display 400 of FIG. 4E is in response to these four selections by the user, and this has reduced the set of 1800 nodes to 3 highlighted nodes (show with solid-lined circles). In FIG. 4E, the "Human Brain" text element may be highlighted by being shown in a solid box (or, in other embodiments, in a different color than other text elements) in the text-based topic visualization 404 to indicate that, while the text element has not been explicitly selected, the text element is common to all the highlighted talks. This may be done because the "Human Brain" text element does not further discriminate among the highlighted talks and is effectively implied by the other elements selected. In FIG. 4E, there are no longer any other text elements left in the word cloud to select, so there isn't any basis for further discriminating among these nodes based on text elements. In the node graph visualization 402, the highlighted nodes are close together, since they share five common topics, and it is obvious both from the display and from the series of selections taken so far that the other nodes nearby are closely related to the highlighted nodes. Hovering over or selecting any of the nodes, highlighted or not, brings up additional information regarding the selected node. Since the content elements in this cases are a collection of videos, embodiments allow the user to play the video represented by the selected node. In other embodiments, if the content elements are a collection of documents, an interface for reading documents represented by selected nodes is provided.

Figure 4F:

FIG. 4F illustrates an example of a characterization in accordance with certain embodiments. In FIG. 4F, a combined display 400 with a node graph visualization 402 and a text-based topic visualization 404 is shown. When a node is selected from the node graph visualization 402, the associated text elements may be highlighted by being shown in a dotted box (or, in other embodiments, shown in another color than other topics) in the text-based topic visualization 404 (e.g., "Brain", "Mind", "Cerebral Cortex", "Neuron", and "Human Brain"). In other embodiments, the exploration and navigation system 110 displays a characterization of a group of nodes or of a region of space. This may be useful, for example, to get a quick determination of what text elements a particular cluster of nodes or view have in common.

Figure 4G:
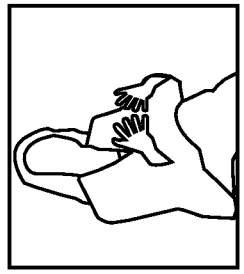
Figure 4G:
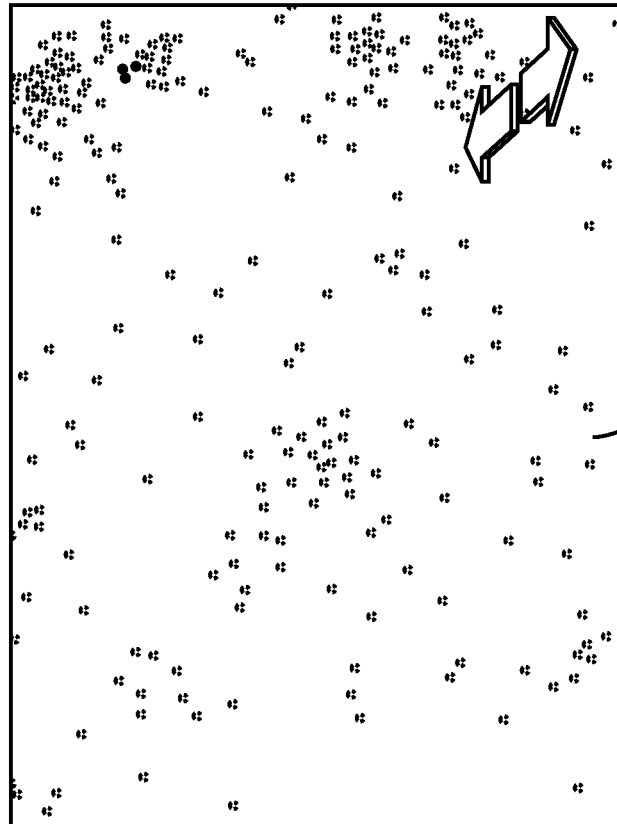

FIG. 4G is like FIG. 4F, except that the user has zoomed out from the highlighted nodes and is navigating around the node graph visualization 402 in FIG. 4G. At any time, the user is free to navigate through the node graph visualization 402. For example, the user may drag the node graph visualization display window around to cause it to scroll, and the user may also zoom in and out, either using on-screen arrows or a mouse scrollwheel. If a particular node is selected, clicking on the associated image will navigate the user back to that node. That is, once a node is selected, information associated with that node is displayed at the top of the display, including a textual description, an image, and in the case of the this example, a video player. If a user clicks on the displayed image, it will bring the user back to the selected node, which may not be on the screen if the user has navigated away or could be zoomed far out.

While the examples of FIGS. 4A, 4B, 4C, 4D, 4E, 4F, and 4G have focused on a collection of videos of talks, embodiments may be applied to any collection of content elements that may be categorized by a set of overlapping topics, regardless of how those topics were generated. In certain embodiments, human curated tags are used to categorize the content elements into topics.

In various embodiments, highlighting may be performed using color, circling, underlining, or using other forms of graphical decoration to indicate which text elements are selected or which nodes are highlighted.

The exploration and navigation system 110 discovers the content of a collection, where search would be more difficult to use because the user may not know what to search for. The exploration and navigation system 110 supports search also, allowing for search, for example, by topic (which selects the corresponding topic in the text-based topic visualization), by speaker, by video title, etc. These latter are less valuable when the user doesn't know what content elements are present or who speakers are for videos, but are very valuable when more knowledge of the collection is available, for example, when somebody suggests a talk by a particular speaker. The exploration and navigation system 110 also integrates with content search, which may select a number of the existing content elements based on a search of the collection (e.g., the collection of talk videos).

Figure 5:
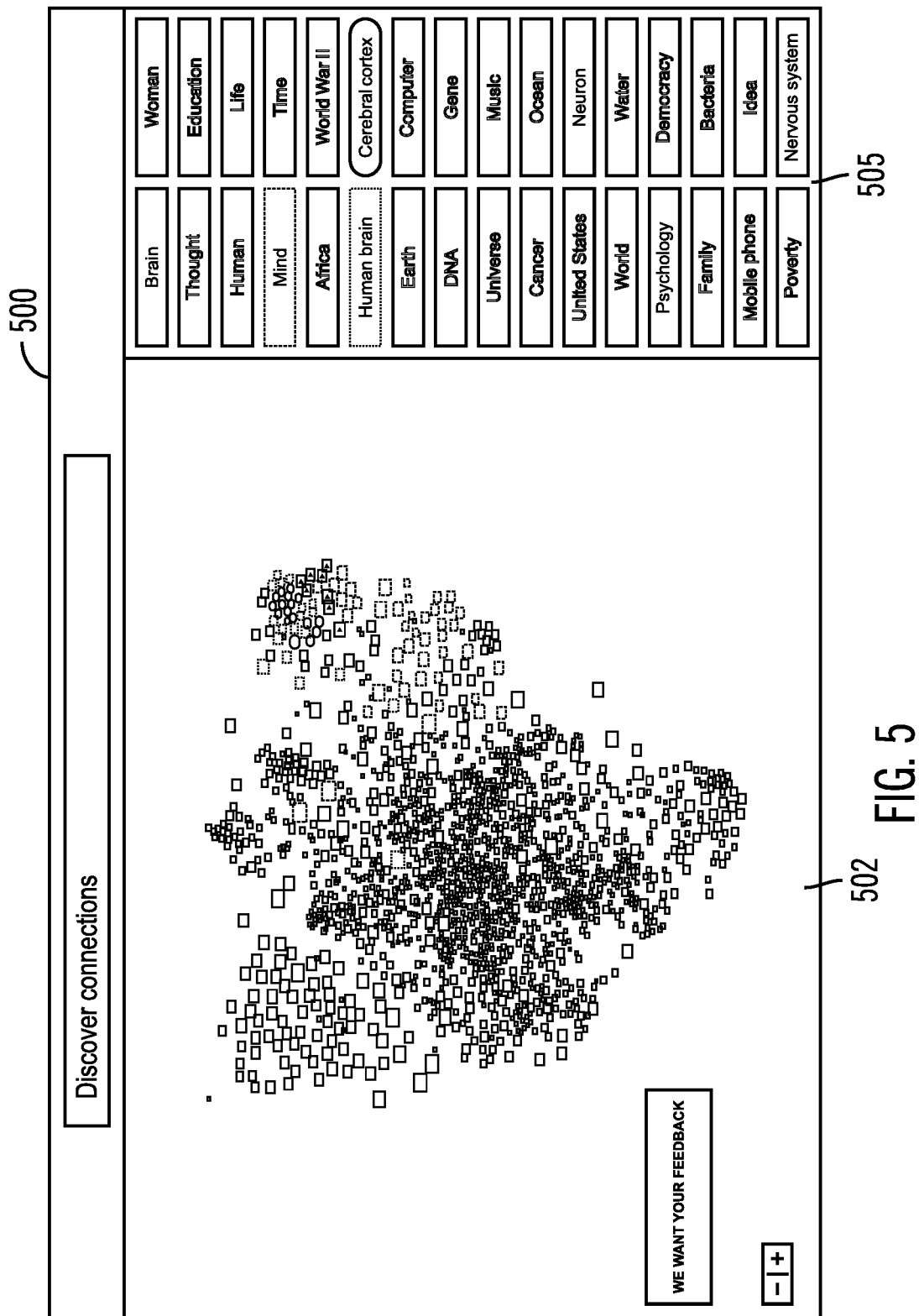
FIG. 5 illustrates an alternative combined display in accordance with certain embodiments.

FIG. 5 illustrates an alternative combined display 500 in accordance with certain embodiments. In FIG. 5, the combined display 500 includes a node graph visualization 502 and a text-based topic visualization 505. In this example, the text-based topic visualization 505 is a topic grid. The topic grid is a grid of text elements representing topics derived from documents in this example. In this example of the topic grid, the topics are ordered by frequency. Additionally, this example provides a "pre-highlighting" of the content elements associated with a text element when the user hovers over a text element and has not yet selected it, thus, giving some awareness to the user of which nodes are associated with that text element, and, therefore, which nodes will be highlighted if the text element is selected. The representation of the nodes is a force directed graph, with invisible connections between nodes based on the text elements that they share. With embodiments, there are invisible nodes in the graph that correspond to the text elements, and those nodes are connected to the visible talk content elements in a force directed display. The actual connections (i.e., the links that connect the nodes to each other, are also invisible). The net effect is to organize the nodes so that nodes representing content elements that share much in common will be close together and nodes representing content elements that do not will be far apart. The combined display 500 will help a user to locate content elements sharing similar topics close together. In the example of FIG. 5, the shapes around the text elements correspond to nodes having the same shapes so that regions associated with different topics is made clear. For example, text elements that are in solid boxes (e.g., "Brain") correspond to nodes that are in solid boxes in the combined display 500, text elements that are in dotted boxes (e.g., "Mind") correspond to nodes that are in dotted boxes in the combined display 500, and text elements that are in ovals (e.g., "Cerebral cortex") correspond to nodes that are in ovals in the combined display 500. Moreover, the "Brain" text element and the "Cerebral Cortex" text element are shown in different typeface to indicate that they have been selected. In other embodiments, selected text elements in the topic grid 505 may be colored uniquely, and nodes in the node graph visualization 502 that are associated with those text elements may be colored with the same colors as the text elements. Nodes that are associated with all of the selected text elements may be colored a particular color and may have an indicator to allow accessing that node (e.g., the indicator may be a video play button).

Figure 6:
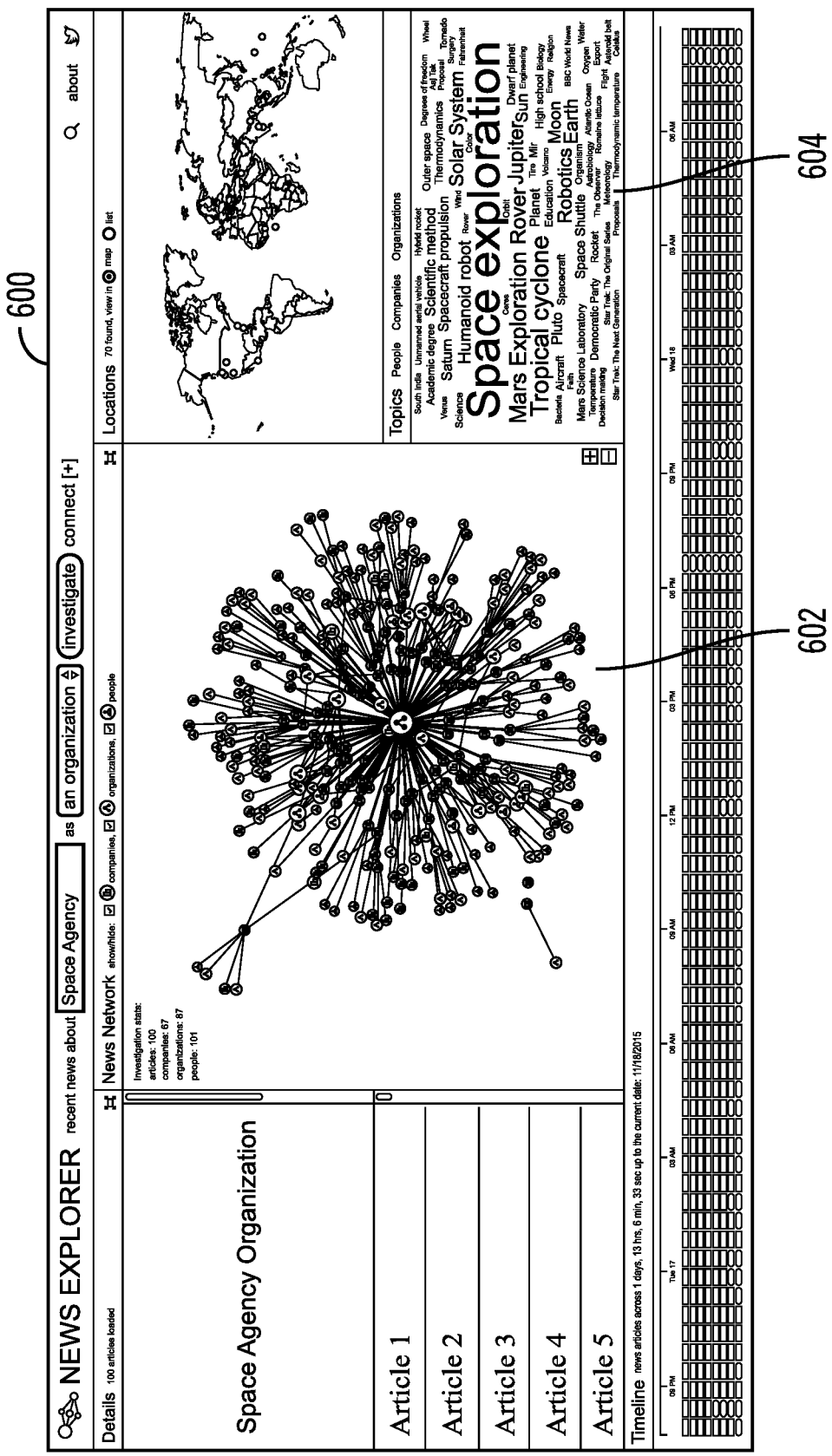
FIG. 6 illustrates a combined display for different types of elements in accordance with certain embodiments.

FIG. 6 illustrates a combined display 600 for different types of content elements in accordance with certain embodiments. In FIG. 6 the combined display 600 includes a node graph visualization 602 and a text-based topic visualization 604. The node graph visualization 602 includes nodes representing news articles and also has nodes representing other entities (people, companies, and organizations). The text elements representing topics (concepts) and locations may be invisible nodes in the node graph visualization 602, which work with the visible nodes to help locate the similar article nodes. The exploration and navigation system 110 applies these principles to a collection of news search results. The text-based topic visualization 604 represents the text elements representing topics discovered in the news articles returned from the search (in this case for news about a particular organization). The node graph visualization 602 represents the articles discovered connected to the people, organizations, and companies mentioned in those articles. The articles are invisibly connected to invisible nodes representing the extracted topics, so nodes representing articles on the same topic will tend to be located near each other. Navigation via the text-based topic visualization enables the user to get an overview of the topics discussed in the news and provides the ability to quickly home in on the articles that discuss topics of interest.

Figure 7:
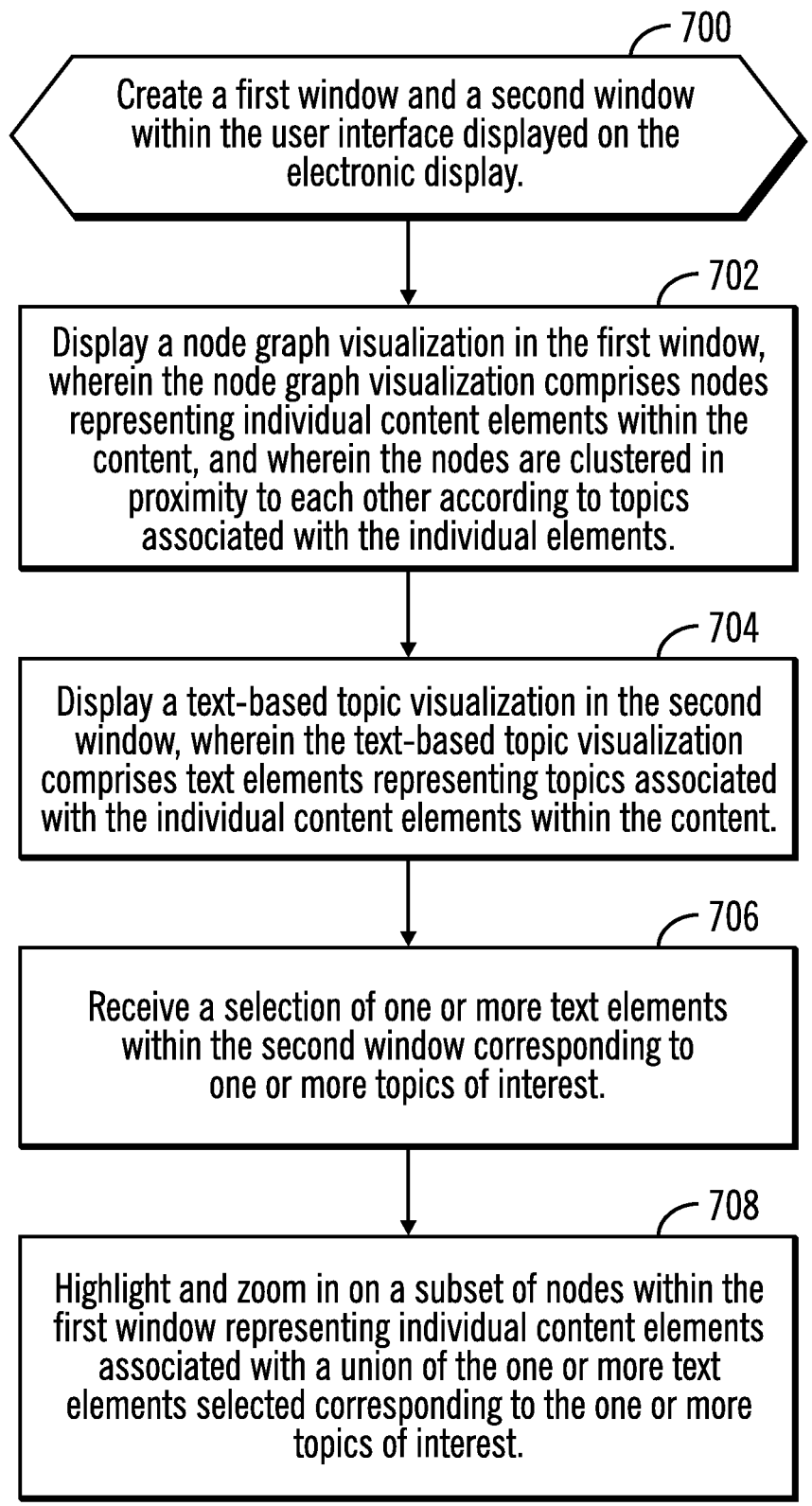
FIG. 7 illustrates, in a flow chart, operations to generate a combined display in accordance with certain embodiments.

FIG. 7 illustrates, in a flow chart, operations to generate a combined display in accordance with certain embodiments. Control begins at block 700 with the exploration and navigation system 110 creating a first window and a second window within the user interface displayed on the electronic display. In block 702, the exploration and navigation system 110 displays a node graph visualization in the first window, wherein the node graph visualization comprises nodes representing individual content elements within the content, and wherein the nodes are clustered in proximity to each other according to topics associated with the individual content elements. In block 704, the exploration and navigation system 110 displays a text-based topic visualization in the second window, wherein the text-based topic visualization comprises text elements representing topics associated with the individual content elements within the content. In block 706, the exploration and navigation system 110 receives a selection of one or more text elements within the second window corresponding to one or more topics of interest. In block 708, the exploration and navigation system 110 highlights and zooms in on a subset of nodes within the first window representing individual content elements associated with a union of the one or more text elements selected corresponding to the one or more topics of interest.

Embodiments provide an interplay between the two separate visualizations: the node graph visualization and the text-based topic visualization. Embodiments provide a combination of a text-based topic visualization and a dimensional reduction diagram of a content collection, where the text-based topic visualization may be used to provide an overview of the collection, as well as to navigate to particular regions of elements and content within the collection.

Figure 8:
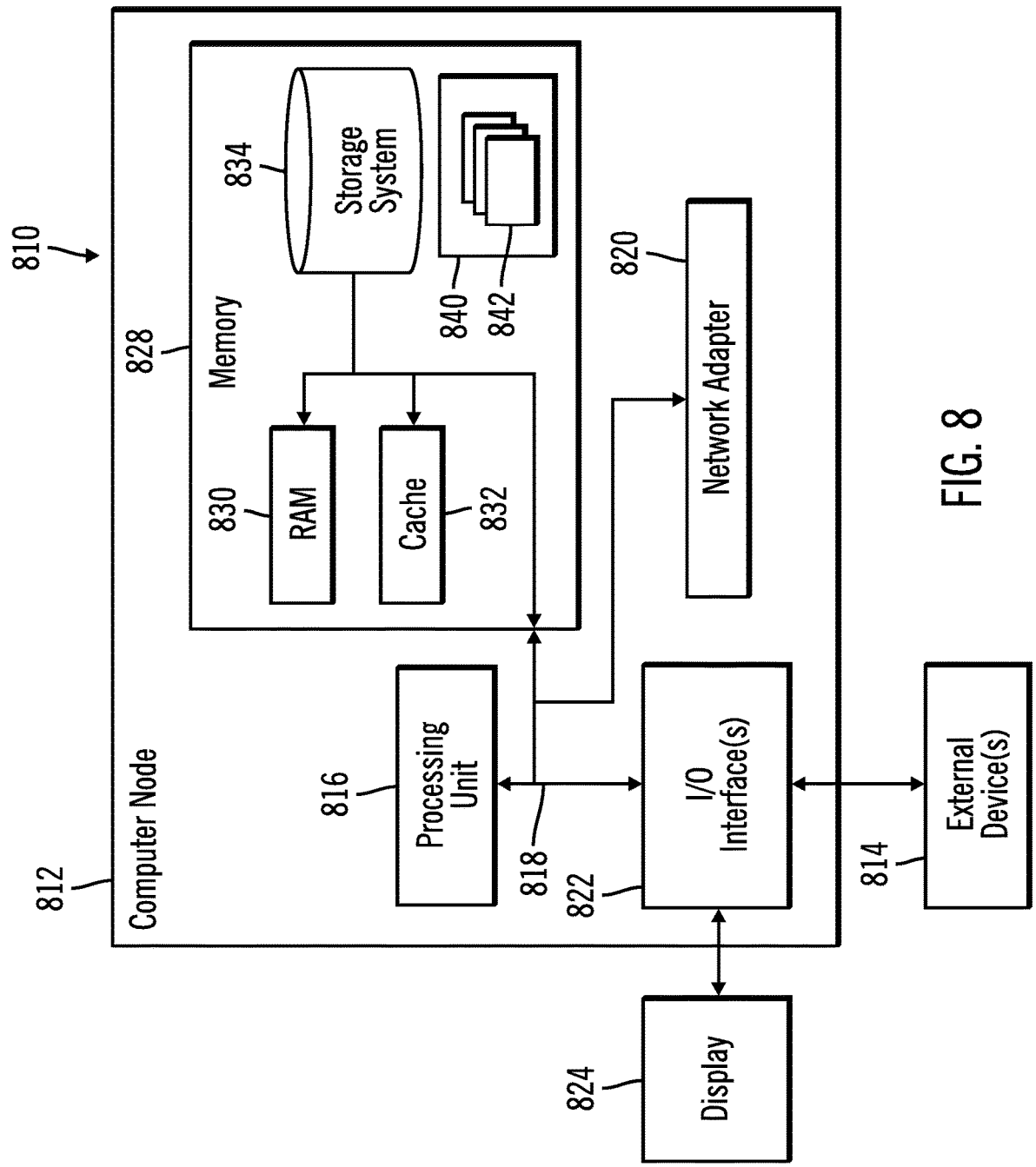
FIG. 8 illustrates a computing node in accordance with certain embodiments.

Referring now to FIG. 8, a schematic of an example of a computing node is shown. Computing node 810 is only one example of a suitable computing node and is not intended to suggest any limitation as to the scope of use or functionality of embodiments of the invention described herein. Regardless, computing node 810 is capable of being implemented and/or performing any of the functionality set forth hereinabove.

In computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

In certain embodiments, the computing device 100 has the architecture of computing node 810. In certain embodiments, the computing device 100 is part of a cloud environment. In certain alternative embodiments, the computing device 100 is not part of a cloud environment.

CLOUD EMBODIMENTS

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
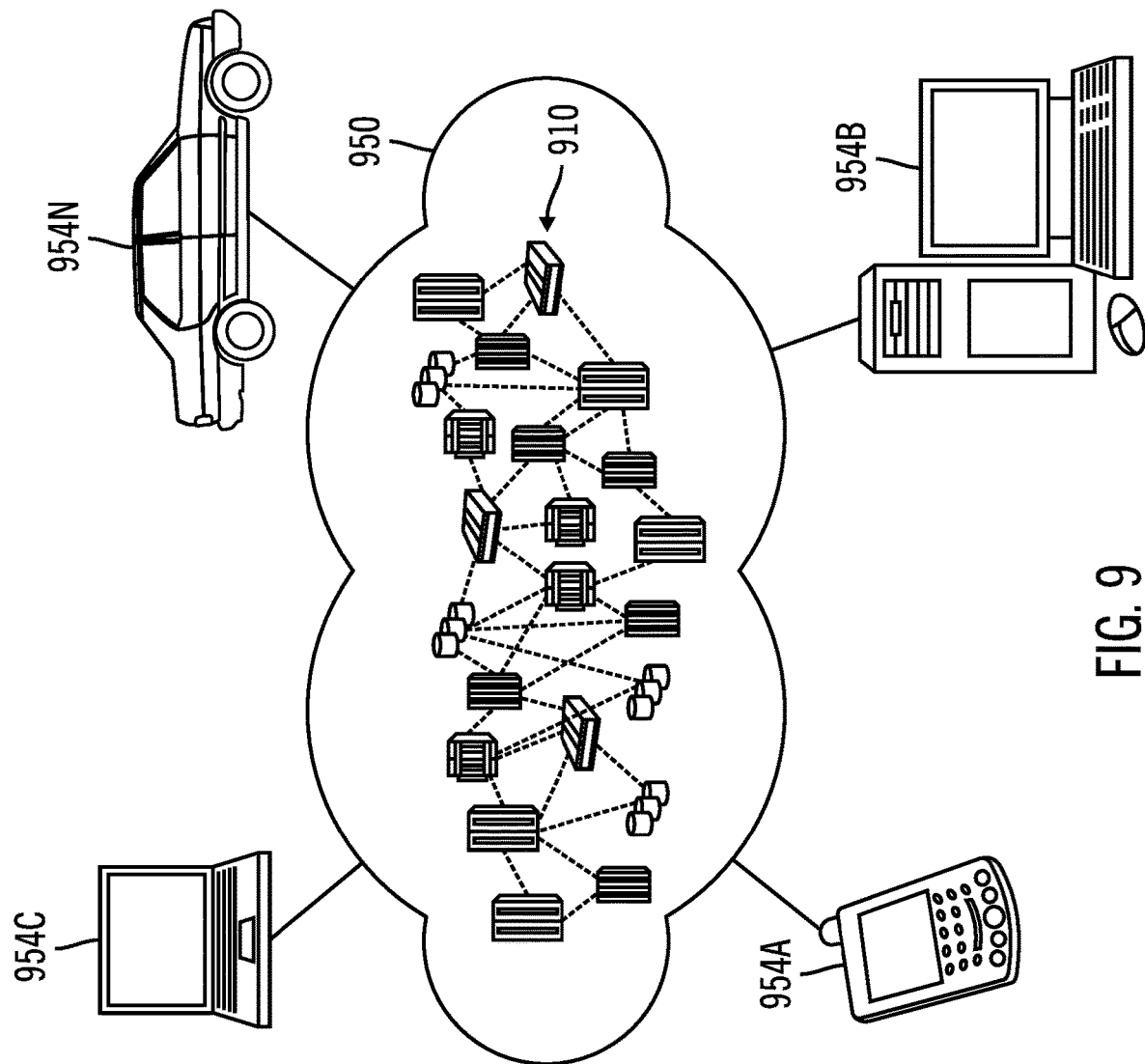
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
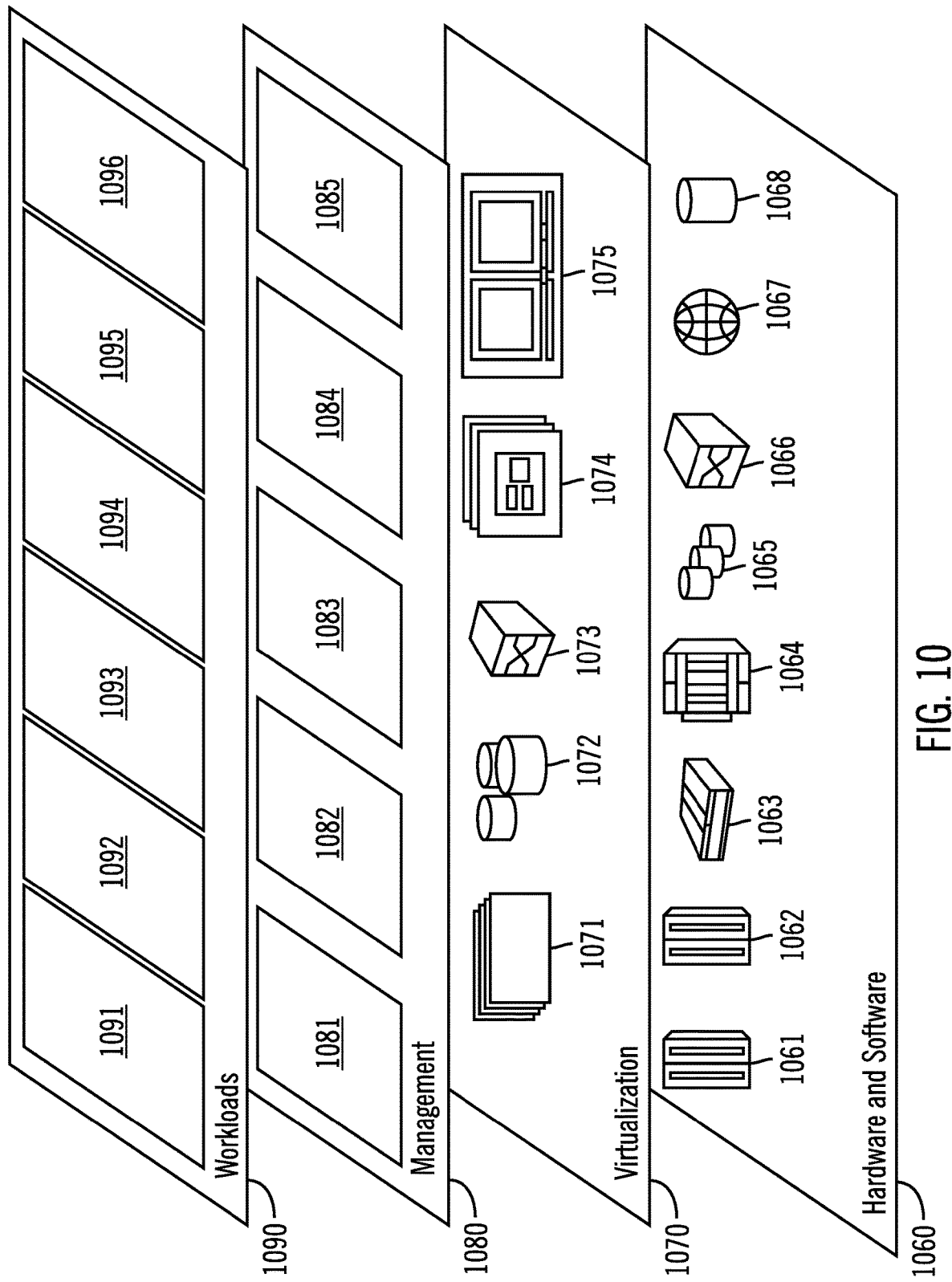
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and exploration and navigation of a collection 1096.

Thus, in certain embodiments, software or a program, implementing and exploration and navigation of a collection in accordance with embodiments described herein, is provided as a service in a cloud environment.

ADDITIONAL EMBODIMENT DETAILS

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    associating individual content elements of content with one or more topics, wherein at least one of the individual content elements is associated with a plurality of topics;
    displaying, in a first window of a user interface, a node graph visualization, wherein the node graph visualization comprises nodes representing the individual content elements;
    displaying, in a second window of the user interface, a topic grid, wherein the topic grid comprises text elements representing the one or more topics;
    in response to receiving, within the second window, a request to select a text element of the text elements, updating the first window and the second window by:
        highlighting, within the first window, a subset comprising a plurality of nodes representing individual content elements associated with the selected text element;
        zooming into, within the first window, a portion of the node graph visualization where the highlighted subset is located;
        computing a union of topics associated with the individual content elements of the highlighted subset; and
        de-emphasizing, within the second window, text elements that represent the topics that are not in the union of topics; and
    in response to receiving, within the second window, a request to unselect the text element,
        removing, within the first window, highlighting from the nodes representing the individual content elements in the node graph visualization that are associated with the unselected text element and not associated with any selected text element;
        zooming out of, within the first window, the portion of the node graph visualization; and
        re-emphasizing, within the second window, the de-emphasized text elements.

2. The computer-implemented method of claim 1, wherein the de-emphasized text elements are disabled.

3. The computer-implemented method of claim 1, further comprising operations for:
    determining distances between the individual content elements based on shared topics; and
    using the distances to position the nodes representing the individual content elements relative to each other, wherein the nodes representing the individual content elements with more topics in common are positioned closer to each other.

4. The computer-implemented method of claim 1, further comprising:
    in response to receiving selection of one of the nodes, highlighting the text elements associated with the selected one of the nodes.

5. The computer-implemented method of claim 4, further comprising operations for:
    in response to receiving a request to unselect one of the nodes, reversing highlighting of the text elements associated with the selected one of the nodes.

6. The computer-implemented method of claim 1, wherein a Software as a Service (SaaS) is configured to perform the operations of the method.

7. A computer program product, the computer program product comprising a computer readable storage medium having program code embodied therewith, the program code executable by at least one processor to perform operations for:
    associating individual content elements of content with one or more topics, wherein at least one of the individual content elements is associated with a plurality of topics;

displaying, in a first window of a user interface, a node graph visualization, wherein the node graph visualization comprises nodes representing the individual content elements;

displaying, in a second window of the user interface, a topic grid, wherein the topic grid comprises text elements representing the one or more topics;

in response to receiving, within the second window, a request to select a text element of the text elements, updating the first window and the second window by:
highlighting, within the first window, a subset comprising a plurality of nodes representing individual content elements associated with the selected text element;
zooming into, within the first window, a portion of the node graph visualization where the highlighted subset is located;
computing a union of topics associated with the individual content elements of the highlighted subset; and
de-emphasizing, within the second window, text elements that represent the topics that are not in the union of topics; and in response to receiving, within the second window, a request to unselect the text element,
removing, within the first window, highlighting from the nodes representing the individual content elements in the node graph visualization that are associated with the unselected text element and not associated with any selected text element;
zooming out of, within the first window, the portion of the node graph visualization; and
re-emphasizing, within the second window, the de-emphasized text elements.

8. The computer program product of claim 7, wherein the de-emphasized text elements are disabled.

9. The computer program product of claim 7, wherein the program code is executable by the at least one processor to perform operations for:
determining distances between the individual content elements based on shared topics; and
using the distances to position the nodes representing the individual content elements relative to each other, wherein the nodes representing the individual content elements with more topics in common are positioned closer to each other.

10. The computer program product of claim 7, wherein the program code is executable by the at least one processor to perform operations for:
in response to receiving selection of one of the nodes, highlighting the text elements associated with the selected one of the nodes.

11. The computer program product of claim 10, wherein the program code is executable by the at least one processor to perform:
in response to receiving a request to unselect one of the nodes, reversing highlighting of the text elements associated with the selected one of the nodes.

12. The computer program product of claim 7, wherein a Software as a Service (SaaS) is configured to perform the operations of the computer program product.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations, wherein the operations comprise:
associating individual content elements of content with one or more topics, wherein at least one of the individual content elements is associated with a plurality of topics;
displaying, in a first window of a user interface, a node graph visualization, wherein the node graph visualization comprises nodes representing the individual content elements;
displaying, in a second window of the user interface, a topic grid, wherein the topic grid comprises text elements representing the one or more topics;
in response to receiving, within the second window, a request to select a text element of the text elements, updating the first window and the second window by:
highlighting, within the first window, a subset comprising a plurality of nodes representing individual content elements associated with the selected text element;
zooming into, within the first window, a portion of the node graph visualization where the highlighted subset is located;
computing a union of topics associated with the individual content elements of the highlighted subset; and
de-emphasizing, within the second window, text elements that represent the topics that are not in the union of topics; and
in response to receiving, within the second window, a request to unselect the text element,
removing, within the first window, highlighting from the nodes representing the individual content elements in the node graph visualization that are associated with the unselected text element and not associated with any selected text element;
zooming out of, within the first window, the portion of the node graph visualization; and
re-emphasizing, within the second window, the de-emphasized text elements.

14. The computer system of claim 13, wherein the de-emphasized text elements are disabled.

15. The computer system of claim 13, wherein the operations further comprise:
determining distances between the individual content elements based on shared topics; and
using the distances to position the nodes representing the individual content elements relative to each other, wherein the nodes representing the individual content elements with more topics in common are positioned closer to each other.

16. The computer system of claim 13, wherein the operations further comprise:
in response to receiving selection of one of the nodes, highlighting the text elements associated with the selected one of the nodes.

17. The computer system of claim 16, wherein the operations further comprise:
in response to receiving a request to unselect one of the nodes, reversing highlighting of the text elements associated with the selected one of the nodes.

18. The computer system of claim 13, wherein a Software as a Service (SaaS) is configured to perform the operations of the computer system.

* * * * *